3,487,937
SEWERAGE TREATMENT PLANT
James Koulovatos, Brunswick, Maine, assignor to Convert-All, Inc., a corporation of Maine
Filed Apr. 26, 1967, Ser. No. 633,754
Int. Cl. C02c 1/40
U.S. Cl. 210—195      4 Claims

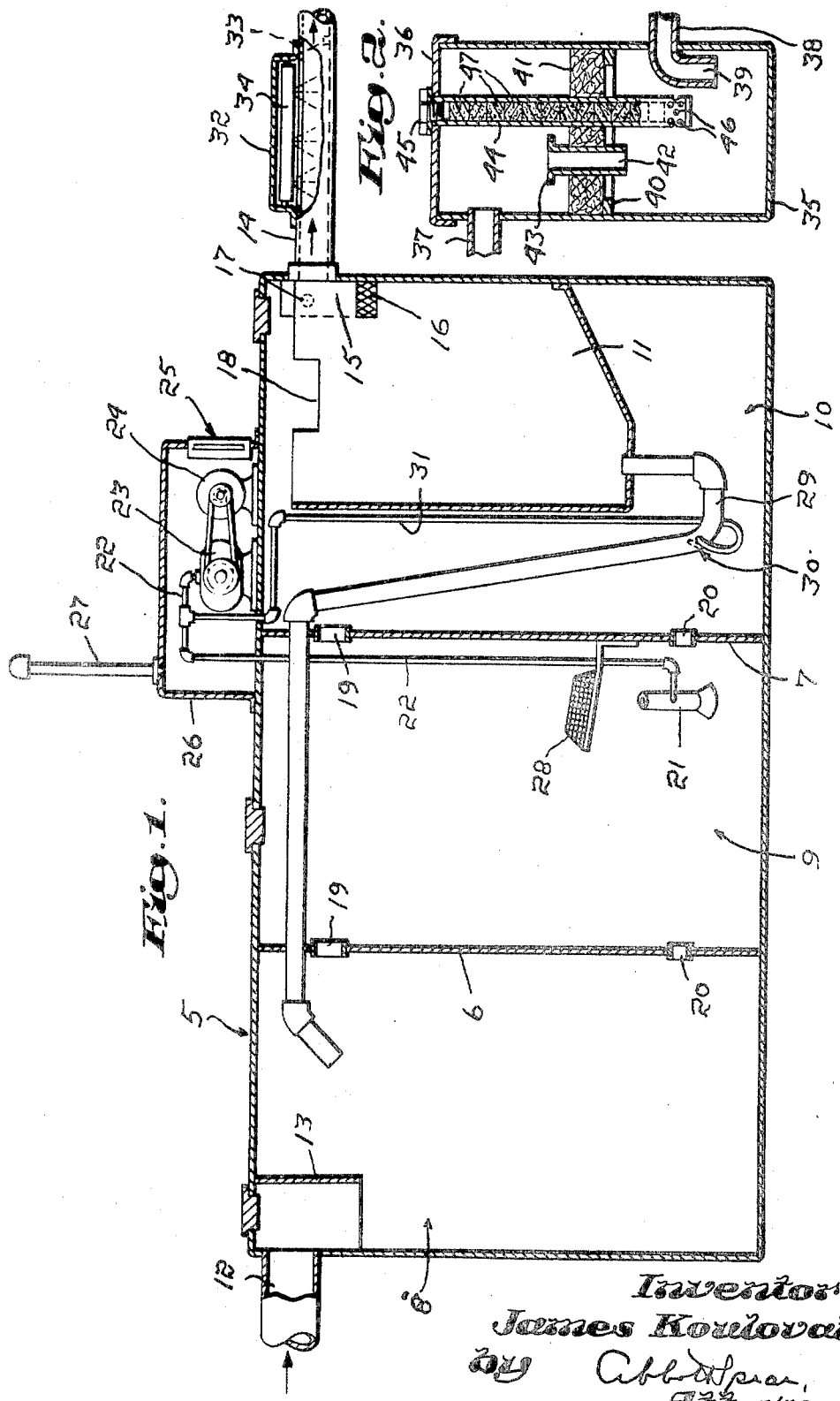

ABSTRACT OF THE DISCLOSURE

Sewerage treatment plant consisting of first, second, third, and fourth sections arranged in series to receive sewerage with the first and third sections consisting of settling tanks, with means to aerate the contents of the second section and with means to deliver sludge for the fourth to the first section, with or without additional treatment by ultra-violet or by chlorination.

---

The present invention relates to sewerage treatment plants, particularly those for domestic users.

The problem of disposal of domestic sewerage is one of ever increasing importance and this is particularly true of domestic users, especially riparian users or those to whom a municipal system is not available.

The present invention has, as a principal objective, the provision of a sewerage disposal plant having physical dimensions and functional capabilities enabling a householder to meet sanitation requirements on a basis consistent in cost with present septic tank systems whose effluent does not meet present requirements.

In accordance with the invention, this objective is met by providing a plant consisting of first, second, third, and fourth sections, conveniently combined in a single cylindrical tank of relatively small diameter. Material to be processed flows serially through the several sections with means assisting the second section and with means returning sludge from the fourth to the first section and contributing to the efficiency of the first section.

Another objective of the invention is to provide for the ultra-violet treatment of the outflow from the fourth section.

Yet another objective of the invention is to provide for the chlorination of the outflow of a sewerage disposal plant by providing a magazine of chlorine tablets that are successively exposed, as each dissolves, in the outflow to ensure its chlorination.

In the accompanying drawings, there are shown illustrative embodiments of the invention from which these and other of its objectives, novel features, and advantages will be readily apparent.

In the drawings:

FIGURE 1 is a somewhat schematic sectional view of a sewerage treatment plant in accordance with the invention, and FIGURE 2 is a similar view of a chlorinating section to be added thereto.

In FIGURE 1, there is shown a sewerage treating plant, desirably a cylindrical tank 5 divided by partitions 6 and 7 into a first section, generally indicated at 8, a second section, generally indicated at 9, and a third section generally indicated at 10. A tank 11 is mounted in the third section 10 and constitutes a fourth treating section.

An inlet 12 opens into the first section 10 against a baffle 13 mounted therein and an outlet 14 is in communication with the upper part of the tank 11 and has its inlet 15 extending a short distance downwardly therein and having a replaceable filter 16 attached thereto and an intermediate overflow-receiving port 17 slightly above the liquid level established by the inlet 12, the outlet 14, and the inlets 18 of the tank 11 are in approximate horizontal alignment. The partitions 6 and 7 both have upper and lower ports 19 and 20, respectively, permitting downstream flow from section-to-section. The ports 19 are spaced below the normal liquid level and the lower ports 20 are spaced well above the bottom of the tank 5.

The first section 10 is primarily a settling tank and while it may be likened, in its functioning, to a conventional septic tank, it is more efficient for reasons that will be subsequently apparent. The second tank is an aerating tank and the means shown for effecting this result are shown as a venturi circulator 21 with its outlet disposed upwardly towards one side of and near the bottom of the tank 5 adjacent the partition 7 with air supplied thereto by a pipe 22 from an air source such as the air pump 23 which is desirably of the Roote's type and driven by a motor 24 whose circuit, not shown, is subject to a control, generally indicated at 25 and of a type operable to close the circuit periodically for regular intervals, fifteen minutes every hour, for example. The pump and motor are within a housing 26 mounted on the tank 5 and provided with an air intake 27. Adjacent the outlet of the circulator 21 there is a screen 28 adapted to assist in the break-up of any solid matter circulated thereby.

The third section 10 is another settling tank and the overflow therefrom enters the tank 11 which is a sludge-collecting tank from whose bottom a conduit 29 leads forwardly through the tank 5 with its discharge in the upper end of the first section 10. Near the lowest part of the conduit 29 there is a venturi pump generally indicated at 30 with an air pipe 31 leading thereto from the pipe 22. By these means, sludge is periodically returned to the section 10 with the air increasing the circulation in that section and causing aeration of its contents.

In FIGURE 1, the outlet shown as opening into a chamber 32 near the outfeed end of which there is a retainer 33 and which has ultra-violet lamps 34 to further treat the outflow.

A desired further treatment of the effluent before its discharge from a sewerage treatment plant, is that of chlorination and while a section for effecting that result may be incorporated with the other section in a single tank, a separate tank for this purpose is shown in FIGURE 2.

In FIGURE 2, a tank 35 is shown as having a removable cover 36 and an inlet 37 adjacent its upper end for connection with the outlet 14 and an outlet 38 having a downturned inlet end 39 spaced above the tank bottom. A flange 40, between the inlet and the outlet, supports a filter 41 which may be of any type but preferably is a molded urethane porous body supporting a tube 42 having its upper end flanged as at 43. The tube 42 comes into service only in the event that the filter 41 becomes clogged. It will be appreciated that the filter 41 is readily replaceable and typically would be replaced at regular intervals.

The filter 41 is also shown as supporting a tubular magazine 44 with its upper end closed by a plug 45 seated on the cover 36. The lower end of the magazine is closed except for perforations 46 and extends a short distance below the water level determined by the outlet 38. Within the magazine, there is a supply of chlorinating tablets 47 which, of course, must be replaced providing as each dissolves to release chlorine at a substantially constant rate.

I claim:

1. A sewerage treatment plant comprising an elongated tank divided into first, second, third, and fourth sections, an inlet in communication with the first section, and an outlet in communication with the upper part of the fourth section, the first three sections being in downstream communication, each with the next following section, the first section constituting a settling tank, the second section constituting an aeration tank and including a venturi circulator and a member directly above the outlet of the circulator and intersecting the circulation path to be engaged by and thus pulverize circulated solid matter, the third section constituting a second settling tank, and the fourth section constituting a sludge collecting tank, a sludge return effecting communication between the bottom of the fourth section and the upper part of the first section, said return including a venturi pump, and a source of air under pressure in communication with said venturi circulator and said venturi pump.

2. The treatment plant of claim 1 in which the outlet includes a portion extending downwardly into the fourth section, and a filter in the inlet end of the portion, and the portion having an overflow port above the filter.

3. The treatment plant of claim 1 in which the fourth section has its inlet approximately at the level of the outlet therefrom.

4. The treatment plant of claim 1 in which the pulverizing member is a screen.

References Cited

UNITED STATES PATENTS

| | | | |
|---|---|---|---|
| 1,633,079 | 6/1927 | Engle | 210—151 X |
| 2,144,386 | 1/1939 | Nordell | 210—195 X |
| 2,228,017 | 1/1941 | Pecker | 210—195 X |
| 2,233,131 | 2/1941 | Hewell | 210—206 X |
| 2,369,232 | 2/1945 | Hinton | 210—198 |
| 2,430,519 | 11/1947 | Mallory | 210—195 X |
| 2,987,186 | 6/1961 | Burgoon et al. | 210—220 X |
| 3,075,645 | 1/1963 | Riddick | 210—220 X |
| 3,271,304 | 9/1966 | Valdespino et al. | 210—220 X |
| 3,298,526 | 1/1967 | Valdespino et al. | 210—195 |

FOREIGN PATENTS 526,545  9/1940  Great Britain.

JAMES L. DECESARE, Primary Examiner

U.S. Cl. X.R.

210—199, 206, 220, 295